United States Patent [19]

Heerten et al.

[11] Patent Number: 5,221,568
[45] Date of Patent: * Jun. 22, 1993

[54] WATER AND/OR OIL-PERMEABLE SEALING MAT CONSISTING SUBSTANTIALLY OF A SUBSTRATE LAYER, A LAYER OF SWELLABLE CLAY AND A COVER LAYER

[75] Inventors: Georg Heerten, Lübbecke; Karsten Johannssen, Rahden; Volkard Müller, Petershagen-Masslingen, all of Fed. Rep. of Germany

[73] Assignee: Naue-Fasertechnik GmbH & Co. KG, Fed. Rep. of Germany

[*] Notice: The portion of the term of this patent subsequent to Aug. 20, 2008 has been disclaimed.

[21] Appl. No.: 664,575

[22] Filed: Mar. 6, 1991

[30] Foreign Application Priority Data

Mar. 6, 1990 [DE] Fed. Rep. of Germany ....... 4006984

[51] Int. Cl.$^5$ .......................... B32B 7/02; B32B 5/02; B32B 5/16; E02B 11/00
[52] U.S. Cl. .................................... 428/213; 428/220; 428/234; 428/240; 428/241; 428/283; 428/300; 428/332; 405/38; 405/107; 405/109; 405/115
[58] Field of Search ............... 428/213, 220, 234, 240, 428/241, 283, 300, 332; 405/38, 107, 109, 115

[56] References Cited

U.S. PATENT DOCUMENTS

| | | | |
|---|---|---|---|
| 2,277,286 | 3/1942 | Bechtner | 405/170 |
| 4,048,373 | 9/1977 | Clem | 428/182 |
| 4,070,839 | 1/1978 | Clem | 52/448 |
| 4,129,588 | 2/1979 | Clem | 264/232 |
| 4,344,722 | 8/1982 | Blais | 405/270 |
| 4,424,248 | 1/1984 | Tesch et al. | 428/172 |
| 4,501,788 | 2/1985 | Clem | 405/270 |
| 4,565,468 | 1/1986 | Crawford | 405/270 |
| 5,041,330 | 8/1991 | Heerten et al. | 428/213 |

FOREIGN PATENT DOCUMENTS 2202185 9/1988 United Kingdom.

Primary Examiner—George F. Lesmes
Assistant Examiner—Terrel Morris
Attorney, Agent, or Firm—Larson and Taylor

[57] ABSTRACT

A water and/or oil-impermeable sealing mat is provided in form of a bentonite non-woven fabric combination with the possibility of transmitting shear from one batt layer to the other, i.e. on a slope shearing forces can be transmitted by the covering batt material through the layer of swellable clay into the supporting batt material. Such a sealing mat is a fiber-reinforced mineral seal permitting the transmission of shearing forces on slopes, without the risk of the layer of swellable clay itself becoming the preferred sliding plane. The sealing mat consists of a non-woven textile material as substrate layer, a layer of swellable clay, preferably sodium bentonite, and a cover layer consisting preferably also of a non-woven textile material, all three layers having been needlepunched together in the conventional manner in a needle loom. When moistened, the clay swells and forms the water and/or oil-impermeable layer. The water and/or oil-impermeable sealing mat is used especially in hydraulic engineering and in waste disposal engineering.

11 Claims, 2 Drawing Sheets

WATER AND/OR OIL-PERMEABLE SEALING MAT CONSISTING SUBSTANTIALLY OF A SUBSTRATE LAYER, A LAYER OF SWELLABLE CLAY AND A COVER LAYER

FIELD OF THE INVENTION

The present invention relates to a water and/or oil-impermeable sealing mat and more particularly to a water and/or oil-impermeable sealing mat particularly suitable as a water and/or oil-barrier for hydraulic engineering, for environmental pollution control for the building of ponds, lagoons, as a soil sealant for hazardous or nuclear waste or for the retention of animal waste as for example, on farms, and such other uses as will become apparent to those skilled in the art upon reading the following description.

BACKGROUND OF THE INVENTION

Said water and/or oil-impermeable sealing mat consists of a flexible substrate layer, a layer of swellable clay, preferably bentonite, and a flexible cover layer.

In the past, bentonite was widely used in various forms to act as a water barrier. So it is already known to provide seepage resistant structures by employing a mass of swellable bentonite across the path of possible seepage or flow. One such method and composition for impeding the seepage or flow of water is disclosed in U.S. Pat. No. 2,277,286 (Bechtner). As therein more fully described, commercial bentonite is used to block leakage or flow of water seepage, and structures of various types are safeguarded against leakage by blocking the path of flow of the water with bentonitic or highy colloidal clay which possess the capacity to swell and gelatinize upon contact with water. One of the clays found best suited for this purpose was the true bentonite obtained in regions of Wyoming and South Dakota, although other highly colloidal, or bentonitic clays which possess the property of swelling and gelatinizing in water to a substantial degree are also useful.

Also in the past, finally divided bentonite was fabricated into a laminate with water absorbent paper sheeting as described for example in the U.S. Pat. Nos. 4,048,373, 4,070,839 and 4,139,588. Such laminates are especially developed for use as a water barrier and are made from corrugated paperboard sheets.

The channels in said corrugated paperboard sheets are filled with finely divided bentonite. When such pannel is placed at the bottom of the pond and is exposed to water, the water passes through the top layer of kraft paper and is adsorbed into the bentonite material. At the same time the paper loses its tensile strength due to the wetting process. The bentonite has the capacity to expand and swell in response to absorbing the water. This expansion of bentonite and the loss of tensile strength of the kraft paper cause the bottom sheet member and the cover sheet member to no longer hold together.

Another way to package bentonite material in sheets or rolls, which can be placed on the bottom of the pond or lagoon so as to form a waterproof barrier thereon, is disclosed in U.S, Pat. No. 4,501,788 (corresponding to European Patent 0,159,625). In said Patent is described a method, for providing such a packaged bentonite sheet material utilizing the following process steps:

(a) Using a support polyester sheet material (for example a porous non-woven fabric) having the ability to permit gases to escape therethrough in a lateral direction.

(b) Applying an adhesive to the upper surface of this sheet material, the adhesive being formed from a starch-like glue.

(c) Applying approximately one-forth inch of bentonite on top of the adhesive.

(d) Spraying a second coat of adhesive over the top of the bentonite.

(e) Placing a scrim or fine mesh material on top of the adhesive.

(f) Press rolling the above combination into a elongated flat sheet material.

(g) Baking the sheet material in a long oven at approximately 300° F. so as to bake all the moisture out of the sheet material and the bentonite.

Not only is the above process cumbersome, expensive and time consuming, but also the support sheet and the cover sheet lose their ability to stick firmly to each other when moistened. This is a very important disadvantage, because the bentonite layer acts in a wet condition like a sliding path on the sides of the pond or other places. This sliding effect is further enhanced by the dissolved adhesive in the wet condition.

Therefore others have tried by a further development to avoid at least one of the before mentioned shortcomings, namely avoiding the use of an adhesive and the necessary baking process which uses such an adhesive. Such a new process which does not require baking or adhesive as above mentioned is disclosed in the U.S. Pat. No. 4,565,468. The process of said patent involves the use of the following steps:

(a) Using a flat polyester sheet material, preferably a synthetic non-woven fabric which is a porous, flexible polypropylene material. The sheet material is capable of dissipating gas in a lateral direction so as to permit gas which gathers adjacent the sheet material to pass laterally outwardly through the sheet material.

(b) Applying approximately one-fourth inch of bentonite over the top of the base material.

(c) Applying plain kraft paper or other biodegradable material over the top of the bentonite. This material must be capable of degrading after hydration.

(d) Stitching the sheet material to the base material with the bentonite being positioned between the two sheets of material. In the preferred form the stitches extend in crossing diagonal lines with respect to the longitudinal axis of the sheet material so as to form diamond shaped quilted compartments between the upper sheet material and the base sheet material. The quilted compartments contain bentonite therein. The quilted arrangement prevents the bentonite from shifting during the rolling of the quilted material and during transportation. In another form the kraft paper is corrugated so as to form elongated corrugated compartments for containing the bentonite material.

When the above material is placed within a water environment, such as at the bottom of a pond or lagoon, the bentonite expands and breaks the kraft paper layer at the top of the barrier. The bentonite continues expanding so as to cover the stitch holes formed by the stitching, and thereby forms a water impervient layer.

As seen from the above description it may be that the process for the production of the sheet material according to the U.S. Pat. No. 4,565,468 is better than according to the process of the U.S. Pat. No. 4,501,788 (corresponding to European Patent 059 625), but there is still the large disadvantage that the bentonite layer during the use as a water barrier in a wet condition acts like a sliding path on slopes.

All of the sealing mats described in the obove U.S. patents serve merely to "package" bentonite and always consist in principle of a substrate layer, a bentonite layer and a cover layer. After these sealing mats have been laid out and subsequently moistened, the substrate and cover layers are connected only via the swollen bentonite layer therebetween, which has the consistency of grease. Now if it is considered that the sealing mats must further be weighted down with a sand or soil filling and then with gravel or rocks not only on flat surfaces, but also on slopes, it is easily conceivable that such a filling on the swollen intermediate bentonite layer, which acts like a slide, slips off, which is often observed in practice.

Thus, in principle, the sealing mats described in the abovegiven U.S. patents—as already indicated—serve only to pack the bentonite in flat form, such that the cover layer disconnects from the substrate layer upon the swelling of the bentonite and a continuous bentonite layer takes shape.

However, in reality such a bentonite layer can be produced more simply and inexpensively in situ in the manner described in the U.S. Pat. No. 4,344,722. Said patent provides a method and a system for waterproofing a desired substrate and further contemplates a waterproof and chemical-resistant product. The method comprises providing a length of flexible moisture-permeable thin, synthetic sheet material having desired characteristics, placing in contact with the substrate to be waterproofed a layer of the material, covering the layer of material with a central layer of bentonite (Montmorillonite clay) and placing on top of the bentonite a third layer of the fabric. The flexible moisture-permeable thin, synthetic sheet material is typically a non-woven fabric.

All of said prior sealing mats described above have the great disadvantage that the bentonite interlayer sandwiched therebetween can freely expand in all three dimensions when moistened, which results in a bentonite sliding plane.

Therefore applicant already tried to avoid the above mentioned disadvantages of the prior art with a sealing mat described in U.S. Pat. No. 5,041,330 which comprises a substrate layer, an interlayer of swellable clay, and a cover layer, in which at least one of the substrate layer and the cover layer consists of non-woven textile material; the other one, if any, of the substrate layer and the cover layer consisting of woven or knitted fabric and in which all three layers are bonded together by needle punching.

In the manufacture of such sealing mats, first of all, the granulated or powdered swellable clay is applied to the substrate layer and then the cover layer of non-woven sheets, i.e. a layer of needle-punchable fibers, is applied to the granulate or powder layer. These needle-punchable fibers are engaged by downwardly directed barbs arranged laterally of the shaft of the needle which are used for instance during the fabrication of non-woven sheets. The fibers which are thus engaged by the needles during needle punching are deflected in a direction perpendicular to the plane of the surface of the cover layer. This requires a certain strength and pliability of the fibers, and in the case of fibers an adequate staple length, in the case of endless filaments, for instance a deposition in the form of loose loops or coils, so that such loops can be downwardly drawn by the barbs without tearing the filaments.

As is known from the needle punching art a multiplicity of needles simultaneously carry out a needle puncturing operation and throughout a number of successive strokes, so that there results for instance a stitch density of 60 stitches per cm$^2$ from the side of the cover or top layer into the support layer. The barbs of the needles, upon passage through the cover layer, tear along individual fibers or entire clusters of holding fibers and partially orient them to a point past the support layer. Upon retraction of the needles the holding fibers are stripped off of the barbs. The holding fibers then for the most part remain anchored over part of their length in the cover layer, whereas another part of the length of the same fibers is fixedly retained by the support layer. Owing to the multiplicity of needle stitches there are drawn-in such holding fibers at numerous locations distributed over the entire surface. Consequently, there are thus held together the support layer and the cover layer. On the other hand, the layer of particles has drawn therethrough numerous fibers, so that the particles are prevented from any lateral shifting in the plane of the surface of the article. The particles are embedded in a loosened form between the holding fibers. These holding fibers hold the layers together.

Therefore needling of the three layers on the needle loom in the manner as described in the above mentioned U.S. Pat. No. 5,041,330 provides a mechanical coherence of the three layers of the sealing mat and at the same time obviates the adhesive used according to the above mentioned U.S. Pat. No. 4,501,788.

Moreover, as the bentonite swells when moistened, the needling bond provides a pressure counteracting the swelling pressure which, in combination with the above described intensive mixing of fibers and bentonite, provides water impermeability of said sealing mats. Furthermore, needling ensures flexibility of the sealing mats to a degree that comes close to the good pliability properties of mechanically bonded non-woven textile materials.

Although, as the above statements show, the sealing mats according to U.S. Pat. No. 5,041,330 are in many aspects much better than the other sealing mats of the prior art, it has been found, that the transfer of shearing forces from the upper cover layer to the substrate layer should be improved.

Therefore, a primary object of the present invention is to provide a water and/or oil-impermeable sealing mat containing a swellable clay, preferably bentonite, said sealing mat being constructed such that in practical application on construction-sites, especially on slopes it can transfer such shearing forces caused by the sand and rock loads from the upper cover layer through the swollen intermediate bentonite layer directly onto the substrate layer. In other words, the water and/or oil-impermeable sealing mat according to the invention should be securely bonded even after the swelling of the bentonite, to prevent the sand or gravel filling weighted down with gravel or rocks from sliding off.

Starting from this, a further object of the present invention is to provide such a water and/or oil-impermeable sealing mat, which can be easily and econonomically manufacand mass produced.

A still further object of the present invention is to provide a water and/or oil-impermeable sealing mat, which can be manufactured in varying thickness for different applications as a water barrier, which prevents the seepage of water and/or the leaching of contaminants from ponds, reservoirs, dams, municipal and industrial waste lagoons or the like.

DETAILED DESCRIPTION OF THE PREFERRED EMBODIMENTS

Figure 1:
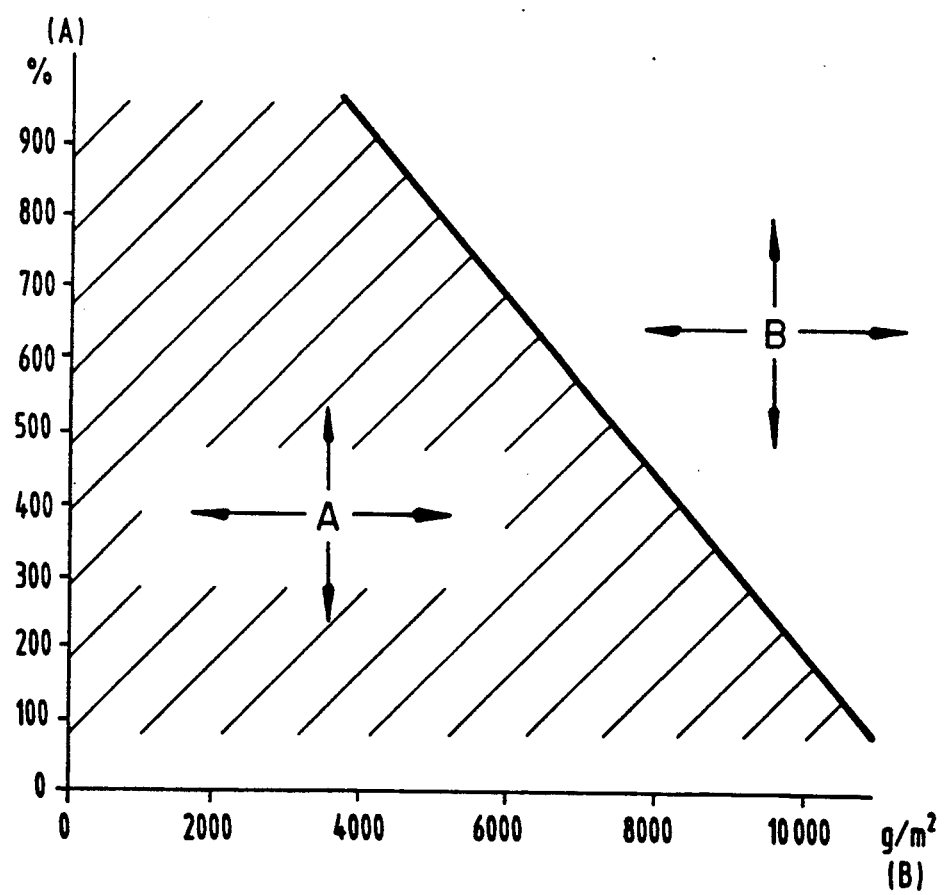
FIG. 1 is a graph indicating the swelling capacity of the intermediate clay layer as a percentage as against the area weight of the swellable clay layer between the substrate layer and the cover layer.
Figure 2:
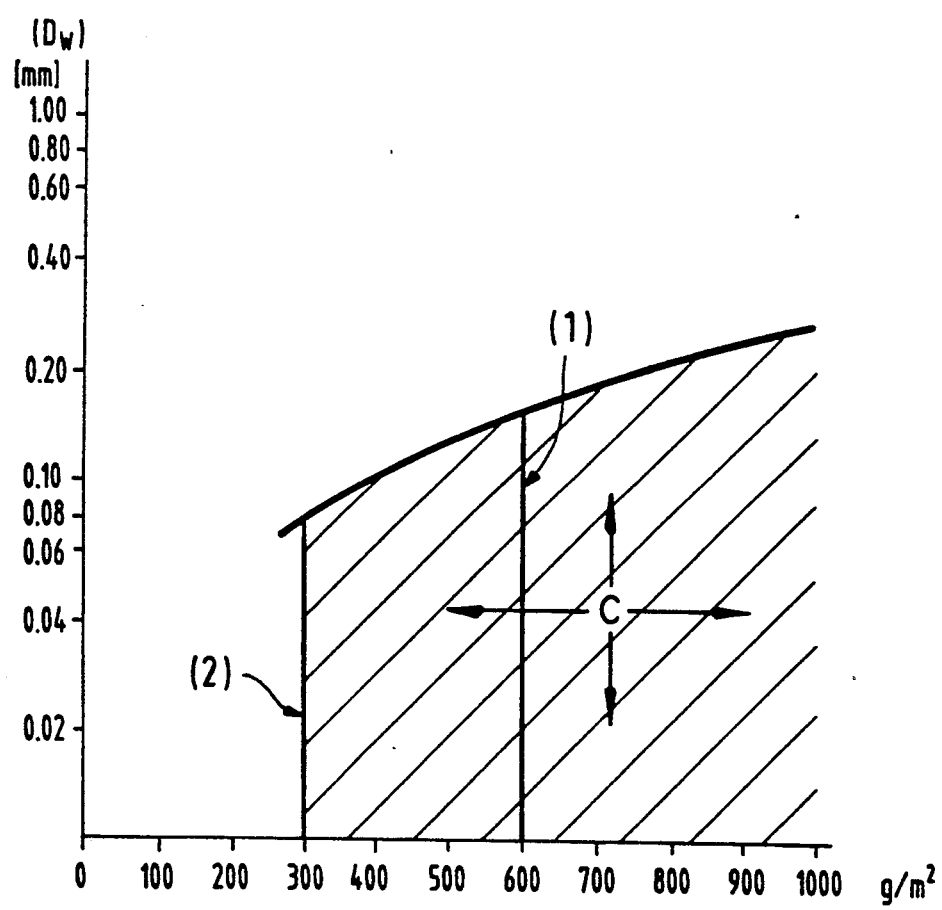
FIG. 2 is a graph illustrating efficient opening size of the non-woven textile material against the area weight thereof.

These objects are realized according to the present invention by a water and/or oil-impermeable three layered sealing mat for use as a water and/or oil barrier comprising a substrate layer, a cover layer, and an intermediate layer of swellable clay, said substrate layer and cover layer being selected from the group consisting of a non-woven textile material, a woven fabric, a knitted fabric and a plastic sheet with the proviso that at least one of said substrate layer and said cover layer is comprised of a non-woven textile material, wherein (a) the swellable clay is of a powdered form having a particle size approx. 90% of which are smaller than 0.06 mm and approx. 70% are smaller than 0.002 mm, and the layer thickness of the swellable clay between substrate layer and cover layer is in direct relation to the swelling capacity of the clay according to the diagram given in FIG. 1 and lies in the hatched part of the diagram marked A and representing the "suitable range", and (b) the applied non-woven textile materials have an area weight and an efficient opening size $D_w$ which lie in the hatched part of FIG. 2 marked C and representing the "permissible range" of the diagram.

The three layers are bonded together by needle punching to provide multiple individual holding fibers extending through the swellable clay layer and anchoring said substrate to said cover layer, so as to maintain intact the bonding of the resulting three layer mat even after swelling of the clay in said swellable clay layer, and providing a sealing mat which when used on construction sites permits shearing forces to be directed above the clay layer toward the upper edge of the substrate layer without risk of the clay layer becoming a sliding plane.

The diagram illustrated in FIG. 1 shows the suitable range A and the unsuitable range B for the needle-punching technique regarding the relation between the clay quantity used and swelling capacity for the production of the sealing mats according to the invention.

A long-term efficient cohesion between substrate layer and cover layer throughout the swellable clay layer can only be achieved with the needle-punching technique when the applied quantity of clay (g/m²) and its swelling capacity harmonize. That means that with the use of a high-swellable clay the applied quantity is comparably small, because the high swelling capacity breaks up the needle-punching compound with only small applied quantities after watering. On the other hand, if clay with a low swelling capacity is used, larger clay quantities can be applied.

According to an other important feature of the invention the diagram illustrated in FIG. 2 shows for the non-woven textile materials used according to the invention the suitable combinations of area-weight and effective opening size $D_w$ found out in the tests, differentiating between stripper plate side and punched hole plate side, which here means differentiating between the cover layer (which is normally located on the stripper plate side, also called upper perforated plate side) and the substrate layer (which is normally located on the punched hole plate side also called perforated bottom plate side). In FIG. 2, vertical line (1) represents the lower limit of the non-woven textile material contacted with the punched hole plate (perforated bottom plate) while vertical line (2) represents the lower limit for the non-woven textile material contacted with the stripper plate (upper perforated plate).

The definitions of the non-woven fabric parameters are area weight (g/m²) and effective opening size ($D_w$/mm) as characteristic pore size to obtain a long-term efficient needle-punching cohesion with a safe encapsulation of clay particles in the mentioned range of particle sizes (approx. 90% smaller than 0.06 mm and approx. 70% smaller than 0.002 mm).

It is known from the filtering technique, that particles of a particle size can be held back by relative thin and light products with a small effective opening size $D_w$. An increase of the effective opening size can be permissible, if the thickness and the area weight of the non-woven textile material is increased at the same time; thus a longer filtration length is available. According to applicants extensive experiences and tests to realize the needle-punching of non-woven textile materials with an encapsulated clay layer, different requirements result for the non-woven layer to be used depending on the side of the stripper and the punched hole plate of the needle-punching machine.

For example the non-woven textile material used as the substrate layer may have an area weight of 700 g/m² and a maximum effective opening size ($D_w$) of 0.18 mm or lower, for example on the order of 0.14 or 0.09 etc. On the other hand the area weight of the substrate layer has to be at least 600 g/m² and not lower.

The non-woven textile materials used as the cover layer has to have an area weight of at least 300 g/m². Therefore the substrate layer may have for example an area weight of 400 g/m² and an effective opening size ($D_w$) of maximum 0.10 mm or lower.

In general the non-woven textile materials have preferably an area weight of about 300 to about 1000 g/m², a thickness of about 2 to about 8 mm, effective opening size between about 0.08 and about 1.5 mm, water permeabilities at a load of 2 kN/m² between about $10^{-3}$ and about $10^{-2}$ m/s and are made of spinning fibers with a length of cut of about 60 to about 150 mm, preferably of about of 120 to about 150 mm.

For example, one of the sealing mats according to the present invention has the following characteristics:

1. Sheet thickness of the bentonite layer dry: about 2 mm
   after 3 hours storage in water: about 8 mm 2. Sheet thickness of the bentonite mat (mm)

| load | dry | after 3 hrs' storage in water |
| --- | --- | --- |
| 2 kN/m² | 9.9 | 14.9 |
| 20 kN/m² | 8.9 | 13.9 |

3. Also in wet swelled state there still exists a very good bond between supporting batt material and covering batt material.
4. Preferably fibers of 120 mm to 150 mm length are employed.
5. The needle punching through the bentonite layer results in a fibre-reinforced bentonite mat which enables a transfer of shear stresses to the bentonite layer (from the top side of the bentonite mat to the bottom or the other way round). The shear stresses have been determinded in a shearing test at a load of 200 kN/m$^2$ with 120 kN/m$^2$.

Preferably both the substrate layer and the cover layer consist of non-woven textile material. However, also a structure may be desirable in which the substrate layer consists of non-woven textile fabric and the cover layer consists of woven or knitted textile fabric or a plastic sheet or the cover layer consists of non-woven textile fabric and the substrate layer consists of woven or knitted fabric or a plastic sheet.

The non-woven textile fabrics and the plastic sheets employed preferably consist of high grade synthetic resins, especially of polyethylenes, polypropylenes, polyesters, polyacrylates and/or polyamides. For use in waste disposal engineering non-woven textile materials made from high density polyethylene (HDPE) are especially preferred.

Such non-woven fabrics and plastic sheets are resistant to rotting (resistant to all substances occuring in bodies of water and in soil) and thus warrant evidently an extremely long service life. Their extraordinarily high tear strength provides substantial resistance to mechnical wear. They are highly stable toward ultra-violet radiation.

The non-woven textile materials employed according to the invention preferably have the mechanically consolidated structure of staple fiber batts. The crimped fibers are assembled to form a sheet structure with a maze of interstices. This ideally imitates the structure of the soil. The structure of the non-woven textile materials can be made coarser or finer, depending on the nature of the soil, so that the optimum adaption to the type of soil at the site of use is warranted. The mechanical consolidation ensures a high friction coefficient between the soil and the non-woven textile material and the covering material. Instead of the non-woven textile fabrics mechanically bonded by needling also non-woven textile fabrics can be employed which were consolidated mechanically by stitchbonding or by swirling, or which were chemically bonded.

According to another embodiment of the present invention, both the substrate layer and the cover layer consist of a non-woven textile material, and, in addition to that a woven textile material and/or a plastic sheet and/or a woven reinforced plastic sheet is placed between the substrate layer and the layer of swellable clay, wherein all of said layers are also needle-punched together.

According to the present invention, it is also possible to design the sealing mat as follows: The substrate layer is a non-woven textile material outside the "permissible range" of the diagram according to FIG. 2 and, in addition, a split film woven (textile raw material optional, preferably polyolefin) with an area weight higher than 80 g/m$^2$ is needle-punched between the substrate layer and the clay layer, and the non-woven textile material is preferably a needle-punched non-woven textile material with an area weight of 250 g/m$^2$.

On the other hand, the substrate layer may consist only of a split film woven (textile raw material optional, preferably polyolefin) with an area weight higher than 150 g/m$^2$ or only of a plastic sheet with a thickness not smaller than 200 μ (0.2 mm).

The textile substrate respectively the substrate plastic sheet, which comes to rest at the punched hole plate when passing the needle loom, can thus either be (1) a needle-punched non-woven textile material according to the diagram given in FIG. 2, the fiber raw material of which is optional, however, synthetic fibers are preferred;
(2) made of split film woven with an area weight of at least 150 g/m$^2$, the textile fiber raw material of which is optional, however, polyolefin is preferred;
(3) a plastic sheet with a thickness of at least 200 μ (0.2 mm) consisting of rotting, preferably polyolefin, particularly high density polyethylene (HDPE);
(4) a combination of non-woven textile material with split film woven and/or plastic sheet and here, the non-woven textile material can have area weights outside the diagram given in FIG. 2. Example: Needle-punched non-woven textile material with 250 g/m$^2$ combinated with split film woven of at least 80 g/m$^2$; or
(5) a combination of coarse and fine non-woven textile materials needle-punched together, one of which has to correspond in its properties to the diagram given in FIG. 2.

The interlayer of swellable clay preferably consists of bentonites. Bentonites are clays having an appreciably to high content of smectite (montmorillonite) which decisively determines the properties (high swellability, good water absorption capacity, high plasticity). In order to obtain from an alkaline earth metal bontonite having low swellability in water a highly swellably active bentonite the alkaline earth metal ions of the bentonites are replaced by alkali metal ions, preferably sodium ions. Therefore, sodium bentonite exhibiting highly increased plasticity, viscosity, thixotropy and water absorption is preferred for use according to the present invention.

The bentonite is used in powdered form. Particularly preferred is sodium-activated bentonite which has such distribution of particle size that the major or predominant part of the particles have a size below 0.002 mm (2 microns), for example more than about 90% of the particles have a particle size of lower than 0.06 mm and more than about 70% lower than 0.002 mm.

Such a preferred sodium-activated bentonite has for example the following distibutrion of particle size (in the following examples called Bentonite B 4)

| | |
|---|---|
| 60 μm | 1.5% |
| 60–40 μm | 2% |
| 40–20 μm | 1.5% |
| 20–10 μm | 2% |
| 10–2 μm | 6% |
| 2 μm | 87% |
| Chemical Analysis (average): | |
| SiO$_2$ | 56.0% |
| Al$_2$O$_3$ | 20.6% |
| Fe$_2$O$_3$ | 4.7% |
| TiO$_2$ | 0.3% |
| CaO | 2.0% |
| MgO | 3.4% |
| Na$_2$O | 3.0% |
| K$_2$O | 1.4% |
| Loss after igniting | 8.6% |

-continued

| Mineralogical Analysis: | |
|---|---|
| Montmorillonite | 70-80% |
| Illite | 10-18% |
| Quartz | 3-5% |
| Other Minerals | 3% |
| Thickness of the layer | about 0.8 g/cm$^3$ |
| Density of the grain | 2.65 g/cm$^3$ |
| m$^3$/t packed in sacks | 1.20 |

The layer of swellable clay is substantially uniform, Depending on the particular application, the thickness of the said clay layer preferably ranges from 0.5 to 10.0 mm. However, it may also be smaller or greater, which depends on the employed clay or for which purpose the sealing mat shall be used. In this connection it is pointed out that, in swelling the preferred bentonite increases its volume by 10 to 20 time.

The swellable clay is at least partially embedded in a nonwoven textile layer. Preferably the thickness of the swellable clay layer is less than or substancially equal to the thickness of the non-woven textile layer or layers as a whole.

Preferably about 30 to about 50% of the employed clay is located in the substrate and/or the cover layer.

A preferred embodiment according to the invention is such a sealing mat wherein
(a) the substrate layer and the cover layer consist of non-woven textile materials,
(b) the non-woven textile materials have an area weight of about 300 or 600 respectly to about 1000 g/m$^2$, a thickness of about 2 to about 8 mm, effective opening-sizes between about 0,08 and about 1.5 mm, water permeabilities at a load of 2 kN/m$^2$ between about $10^{-3}$ and about $10^{-2}$ m/s and are made of spinning fibers with a length of cut of about 60 to about 150 mm,
(c) the fibers of the non-woven textile materials consist of high densitiy polyethylene, polypropylene or polyester,
(d) the swellable clay is a powdered sodium-activated bentonite and has such distribution of particle size that the major or predominant part of the particles have a size below 0.002 mm (2 microns).
(e) The thickness of the uniform bentonite layer is about 0.5 to about 10 mm,
(f) about 30 to about 50% of the employed bentonite is located in at least one of the substrate layer and/or the cover layer.

As already mentioned, the substrate layer can consist of two non-woven textile materials needled together, whereof the one non-woven material has very fine pores according to the diagram illustrated in FIG. 2 and the non-woven material associated with the bentonite layer has coarse pores. In this case the coarse-pored non-woven textile material (upper limit D$_w$=1.5 mm) can be filled up to 100% with bentonite.

The production of the sealing mat according to the invention is carried out such that first that interlayer of dry, swellable clay is applied onto the substrate layer and thereon the cover layer is placed, whereafter all three layers are needled in a needle loom.

For this purposes the bentonite is applied from a supply bin as bentonite interlayer onto the substrate layer (preferably a non-woven textile material) wound off a supply reel. Thereafter the cover layer (a non-woven textile material) likewise wound off a supply reel is placed on the bentonite interlayer. The thus obtained sheet structure composed of three layers is passed through a needle loom in which all three layers are needled in a manner known per se. Depending on the thickness of the bentonite interlayer the needled sheet structure representing the water impermeable sealing mat is wound on reels or is cut into the particular lengths desired for the contemplated use.

The needling treatment results in a contiguous fiber bond between substrate and cover layer.

The substrate and the cover layer are in such a way bonded together by needling so that shifting, i.e. shearing force, e.g. on slopes, can be transmitted by the cover layer via the fiber composite to the substrate layer. Without this fiber composite extending all through the bentonite layer the bentonite layer—especially in swelled condition forms a preferred sliding path on slopes. After swelling of the clay and increase of the sealing mat thickness the cohesion between substrate layer and cover layer by needling remains intact (in order to warrant the transmission of shearing forces). The result is a fiber-reinforced bentonite layer. Besides said reinforcement, the bentonite is locked in the fiber texture.

The impermeable sealing mats of the invention are used especially in hydraulic engineering and waste disposal engineering.

As seen from the above the present invention is directed to a special bentonite non-woven fabric-combination with the possibility of transmitting shearing forces from one batt layer to the other, i.e. on a slope shearing forces can be transmitted by the covering batt material through the bentonite layer into the supporting batt material. The present invention relates to a fiber-reinforced mineral seal permitting the transmission of shearing forces on slopes, without the risk of the bentonite layer itself becoming the preferred sliding plane.

The present invention will now be explained with reference to the following examples, without being restricted thereto.

EXAMPLE 1

In this example a sealing mat of the Type A is described for impermeable revetments on canals, reservoirs or dams with cover layers of riprap. The Type A sealing mat consists of a heavy carrier geotextile which is being produced according to the specifications of the Bundesanstalt für Wasserbau (Federal Institute for Waterway Engineering) as a geotextile filter for soil type 4. Type A can be covered directly with heavy stones.

The following raw materials are used:

| Substrate layer: | double-layered non-woven textile material 800 g/m$^2$ of PES/PP fibers |
|---|---|
| Cover layer: | single-layered non-woven textile material 300 g/m$^2$ of PES fibers |
| Intermediate layer: | Bentonite B4 3000 g/m$^2$ |

The properties of Type A sealing mat are as follows:

| Area weight (g/m$^2$): | approx. 4100 |
|---|---|
| Max. tensile strength (N/10 cm): | |
| longitudinal: | 1600 |
| transverse: | 2500 |
| Elongation at break (%): | |

| | |
|---|---|
| longitudinal: | 60 |
| transverse: | 50 |
| Thickness (mm): | 10 |
| $k_v$ value (m/s): | approx. $1.0 \times 10^{-10}$ |

($k_v$ value is the permeability coefficient)

Bentonite B4 is described here in the specification as "preferred sodium-activated bentonite".

EXAMPLE 2

In this example a sealing mat of the Type B is described for sealings in cultural landscaping (ponds, storage basins, roads in catching areas for potable water), pond linings, etc. with upper layers of sand or gravel ballast. The Type B sealing is provided with a lighter carrier material. The upper layer can only consist of fine grained soils such as sand and gravel or crushed stones. The following raw materials are used:

| | |
|---|---|
| Substrate layer: | single-layered non-woven textile material 400 g/m² of PP fibers |
| Cover layer: | single-layered non-woven textile material 300 g/m² of PP fibers |
| Intermediate layer: | Bentonite B4 3000 g/m² |

The properties of Type B sealing mat are as follows:

| | |
|---|---|
| Area weight (g/m²): | approx. 3700 |
| Max. tensile strength (N/10 cm) | |
| longitudinal: | 1400 |
| transverse: | 2400 |
| Elongation at break (%): | |
| longitudinal: | 60 |
| transverse: | 50 |
| Thickness (mm): | 7.5 |
| $k_v$ value (m/s): | approx. $1.0 \times 10^{-10}$ |

EXAMPLE 3

In this example a sealing mat of the Type C is described for protection of synthetic membranes against coarse draining material (e.g. gravel 16/32 mm) in refuse dumps. The Type C sealing mat makes use of the known high chemical resistance of high density polyethylene (PEHD). Thus, Type C can also be used in refuse dumps or similar highly aggressive environments. Designed as a protection layer for synthetic linings, the Bentonite Impervious Mat with a permeability coefficient of $k_v$ approx. $10^{-10}$ m/s forms an additional impermeable water barrier which reduces possible leakage and protects the membrane against direct contact with encrusted drainage layers.

The following raw materials are used:

| | |
|---|---|
| Substrate layer: | single-layered non-woven textile material 800 g/m² of PEHD fibers |
| Cover layer: | single-layered non-woven textile material 400 g/m² of PES fibers |
| Intermediate layer: | Bentonite B4 3000 g/m² |

The properties of Type C sealing mat are as follows:

| | |
|---|---|
| Area weight (g/m²): | approx. 4200 |
| Max. tensile strength (N/10 cm): | |
| longitudinal: | 1200 |
| transverse: | 1800 |
| Elongation at break (%): | |
| longitudinal: | 140 |
| transverse: | 100 |
| Thickness (mm): | 9 |
| $k_v$ value (m/s): | approx. 1.0 to $10^{-10}$ |

We claim:

1. A water and/or oil-impermeable three layered needle-punched sealing mat for use as a water and/or oil barrier comprising a substrate layer, a cover layer, and an intermediate layer of swellable clay, said substrate layer and cover layer being selected from the group consisting of a non-woven textile material, a woven fabric, a knitted fabric and a plastic sheet, with at least one of said substrate layer and said cover layer being comprised of a non-woven textile material wherein
   (a) the swellable clay is of a powdered form having a particle size of which approximately 90% are smaller than 0.06 mm and approximately 70% are smaller than 0.002 mm, and the layer thickness of the swellable clay between substrate layer and cover layer is in direct relation to the swelling capacity of the clay according to the diagram of FIG. 1 and lies in the hatched part of the diagram marked A, and
   (b) the non-woven textile materials have an area weight and an efficient opening size $D_w$ which lie in the hatched part marked C of the diagram given in FIG. 2.

2. A sealing mat according to claim 1, wherein
   (a) the swellable clay is at least partially embedded in a non-woven textile layer and
   (b) the thickness of the swellable clay layer is less than or substantially equal to the thickness of the non-woven textile layer or layers as a whole.

3. A sealing mat according to claim 2, wherein about 30 to about 50% of the employed bentonite is located in at least one of the substrate and/or the cover layer.

4. A sealing mat according to claim 1, wherein
   (a) the substrate layer and the cover layer both consist of non-woven textile materials,
   (b) the non-woven textile materials each have an area weight of about 300 or 600 g/m² respectively to about 1000 g/m², a thickness of about 2 to about 8 mm, effective opening sizes between about 0.08 and about 1.5 mm, water permeabilies at a load of 2 kN/m² between $10^{-3}$ and about $10^{-2}$ m/s and are made of spinning fibers with a length of cut of about 60 to about 150 mm.

5. A sealing mat according to claim 1, wherein one of the substrate and cover layer is a non-woven textile material and the other layer is a woven or knitted fabric, both the substrate layer and the cover layer consist of non-rotting synthetic resin fibers or filaments, and further including a plastic sheet made from a non-rotting synthetic resin between the substrate and the swellable clay layer.

6. A sealing mat according to claim 5, wherein the substrate layer consists only of a split film woven with an area weight higher than 150 g/m².

7. A sealing mat according to claim 5, wherein the substrate layer consists only of a plastic sheet with a thickness not smaller than 0.2 mm.

8. A sealing mat according to claim 1, wherein the substrate layer and the cover layer are both non-woven textile materials, and further including between substrate layer and swellable clay layer a woven or knitted fabric or a plastic sheet, all of the textile layers and the plastic sheet being made from a non-rotting synthetic resin.

9. A sealing mat according to claim 8, wherein the substrate layer is a non-woven textile material having an area weight and efficient opening size $D_w$ which lies outside of the hatched area C of FIG. 2, and further including a split film woven with an area weight higher than 80 g/m² and formed by needle punching which is located between the substrate layer and the swellable clay layer, and the non-woven textile material being formed by needle punching with an area weight of 250 g/m².

10. A sealing mat according to claim 1, wherein the non-woven textile material, the woven or knitted fabric and the plastic sheet consist of polyolefin or polyester (PES).

11. A sealing mat according to claim 10, wherein the polyolefin is polypropylene (PP) or high density polyethylene (PEHD).

* * * * *